INVENTORS
HAROLD P. WICKLUND
HUGO A. PANISSIDI
BY
J. K. Mosser
AGENT

TAPE STORAGE APPARATUS FOR TAPE PROCESSING UNITS

Filed Dec. 30, 1955 4 Sheets-Sheet 2

TAPE STORAGE APPARATUS FOR TAPE PROCESSING UNITS

Filed Dec. 30, 1955

4 Sheets-Sheet 4

United States Patent Office 3,112,473
Patented Nov. 26, 1963

3,112,473

TAPE STORAGE APPARATUS FOR TAPE PROCESSING UNITS

Harold P. Wicklund, Endicott, and Hugo A. Panissidi, Binghamton, N.Y., assignors to International Business Machines Corporation, New York, N.Y., a corporation of New York Filed Dec. 30, 1955, Ser. No. 556,671
34 Claims. (Cl. 340—174.1)

The invention relates to tape processing apparatus and more particularly to tape processing apparatus capable of It is one of the prime objects of the invention to provide translating tape at high speeds in opposite directions. tape processing apparatus which has an enlarged buffer storage section for portions of the tape.

The use of magnetic data storage tape units for selectively delivering and receiving large amounts of data to and from electronic computing machines has proven very successful. The usual magnetic tape unit is a separate component which is connected to the electronic computer through suitable wiring. In normal operation a spool or reel loaded with tape whose free end is attached to an associated empty spool or reel so that the tape leaving the loaded reel eventually is wound or reeled on the other reel. Rewinding is accomplished in the same manner, except the direction of rotation of the reels is reversed. Between the pair of reels are a group of magnetic data recording and reading heads past which the tape is translated at high velocity by means of reversible drive pulleys or capstans.

Since the inertia of the reels, drive mechanism therefor and the wound tape is relatively high with respect to the capstan drive mechanism, it is not possible to accelerate and decelerate the reels at the same rate as the drive capstan, without exorbitant power requirements or possible damage to the tape. Therefore, a temporary or buffer tape storage means in the form of a vacuum column or chamber has been provided between each reel and the drive capstan. A suitable length of tape on both sides of the drive capstans is looped into the vacuum chambers and a slight vacuum is applied on the outer faces of the looped sections to hold the unreeled tape under a slight tension. Thus as the capstan rotates in either direction, it removes tape from one of the vacuum columns, translates the same past the read and write heads at very high speed without damage to the tape and feeds the same to the other vacuum column.

In order to control reeling and unreeling of the tape, control means is provided in each vacuum column which is responsive to the total length of tape therein to control the operation of the associated reel. Thus as the capstan withdraws tape from the one chamber and the total length of tape stored therein is reduced to a predetermined minimum, the control means acts to initiate rotation of the related reel at some safe acceleration rate to feed tape into the vacuum column. As soon as the tape exceeds a predetermined length, the control means for the associated reel operates to brake the reel to a stop. During this time, the tape leaving the capstan is directed into the other vacuum chamber and when the tape therein reaches a predetermined length, its associated control means is operative to initiate rotation of its related reel to remove the excess tape from the chamber for winding on the reel. Likewise, when the tape length is reduced, the control means is effective to cause braking of the reel to terminate the winding operation.

Tape units of the above-outlined type have proved satisfactory for operation at moderate speeds of 75 inches per second with acceleration limits of approximately 7 milliseconds and using one-half inch wide data tape. However, with improved computer operation speeds, the capacity for receiving and delivering data is far in excess of the top capacity of the normal tape units. Therefore, in order to increase the computer operating efficiency, it is desirable or necessary to increase the rate at which data may be supplied to or removed therefrom. In order to accomplish this increased rate of data transfer, the tape width may be increased to provide additional data tracks along with the tape's acceleration rate and translation velocity. Thus the rate of reading or writing on the tape may be increased considerably over the normal 105,000 bits per second.

The above-mentioned demands are beyond the capacity of the present day tape feed units. One reason is that after receiving a read or write signal, the tape in the supply tape buffer storage column would be consumed at such a rapid rate and the associated reel could not respond and unreel tape in time to prevent damage or breaking of the tape. Likewise, the opposite tape receiving buffer storage column would have tape delivered thereto at a rate faster than its related tape winding reel could respond. Therefore, the excess tape in the column would tend to pile up and be damaged. Increasing the rate of response to the reels beyond predetermined limits is not practical because of the high starting torques required. Even if this solution were applied, relative motion may occur between adjacent layers of the wound tape and the related reel at the very high acceleration and deceleration rates to either corrugate or stretch the tape, depending upon reel rotation, both of which could permanently damage or render the tape useless. Increasing the length of the vacuum columns would provide a too cumbersome storage device.

In accordance with the invention, there has been provided a pair of open ended, elongated upstanding adjacent inner or first and outer or second vacuum columns disposed on each side of the tape drive capstan. The unreeled tape extends from one reel, is directed into the upper open end of the outer column, loops therein, passes over an antifriction bearing surface into the upper open end of the inner column, loops therein, extends from the first column and passes over the drive capstan. The tape extending from the capstan passes through a pair of identical inner and outer columns in the reverse manner and returns to the other reel. This double column arrangement provides an enlarged buffer storage space for increased lengths of unreeled or loose tape which not only permits higher acceleration speeds of the tape and capstan but permits higher tape velocities, while still permitting the reels to be accelerated and decelerated within safe limits.

In order to insure that the tape remains substantially equally distributed in adjacent pairs of vacuum columns, each column has its cross-sectional area decreased from its upper open end to its lower open end. However, at any given longitudinal dimension, the cross-sectional areas of all of the vacuum columns are substantially equal. With a construction of this type, the physical location of the tape loop along the column determines its dimension or width. Thus when the tape loop is adjacent the upper end of the column, a greater total area is exposed to the vacuum than when the loop is adjacent the lower end of the column. This difference in area, of course, results in a corresponding difference in force or tension being applied to the two tape loops, thereby tending to equalize the length of tape in each of the two columns. The force pulling the tape into a column varies with the length of the tape in the column and the differential force between two loops varies with their difference in length. If each tape loop in each column has the same length, each portion of the tape is under equal tension and the system is balanced.

Under the last-mentioned condition, when the capstan receives a start signal, it starts running and removes tape from one of the inner columns and feeds this removed tape into the opposite other inner column, thereby decreasing the total length of the one loop and at the same time increasing the length of the other. The looped end increasing in length is lowered into its column by virtue of the vacuum applied thereto. However, as this loop lowers, its total area exposed to the vacuum decreases because of the tapering column, therefore, the net or over-all tension on both legs or strips of the tape in this column diminishes.

During this interval, the looped tape in the adjacent related column tends for the moment to remain fixed. However, as the exposed area in the inner column decreases, resulting in a lower net tension on the tape therein, and the tape tension in the adjacent column remains fixed, this develops an unbalanced loading condition between the tape in the adjacent columns. When this difference in tension on the tape loops reaches some value, an automatic transfer of tape occurs from the inner column, having the longer loop, into the outer column, having the shorter loop. This tape transfer will continue until the tape tensions, and thus the tape loops, in both columns are substantially equal. If the tape loop in the inner column is shortened, the tape transfer is from the outer to the inner column. In this manner a relatively large quantity of unreeled tape may be stored or removed from the vacuum columns and still permit safe acceleration of the tape reels to their rated speeds for either supplying or removing tape therefrom, without imposing limitations on the tape velocity past the reading and writing heads.

Since the inner vacuum columns adjacent the capstan initially receive or have tape removed therefrom at a faster rate than their associated outer columns, the controls for the reels are disposed in the inner columns. These controls are effective to cause braking or rotation of the reels in either direction to supply or remove tape to or from the outer columns in accordance with the length of the tape in the inner columns.

It is, therefore, another object of the invention to provide a multiple chambered looped tape storage device which permits automatic distribution of the tape therebetween.

It is another object of the invention to provide a multiple chambered tape storage device for multiple loops of tape wherein the difference in length of the loops initiates a transfer of tape therebetween.

It is still another object of the invention to provide translating apparatus for a magnetic data tape with associated groups of vacuum columns which store adjacent loops of tape having substantially equal lengths.

It is another object of the invention to provide a magnetic data tape processing unit with increased buffer storage capacity for unreeled tape which permits high speed reading and writing.

It is yet another object of the invention to provide a tape processing unit which feeds a record tape through a record reading and/or writing head at high velocity without imposing any substantial tension on the tape.

It is yet another object of the invention to provide a data containing tape unit with a multi-column vacuum storage section for unreeled tape which permits high rates of acceleration and deceleration for the tape.

It is still another object of the invention to provide a tape processing unit with a buffer tape storage section which utilizes a combination of a vacuum and fluid under pressure to distribute the tape therebetween.

It is another object of the invention to provide a tape processing unit with a buffer storage section for unreeled tape which includes a combination of fluid under pressure and a vacuum to maintain the tape out of physical contact with the storage section.

Other objects of the invention will be pointed out in the following description and claims and illustrated in the accompanying drawings, which disclose, by way of examples, the principle of the invention and the best mode, which has been contemplated, of applying that principle.

Figure 1:
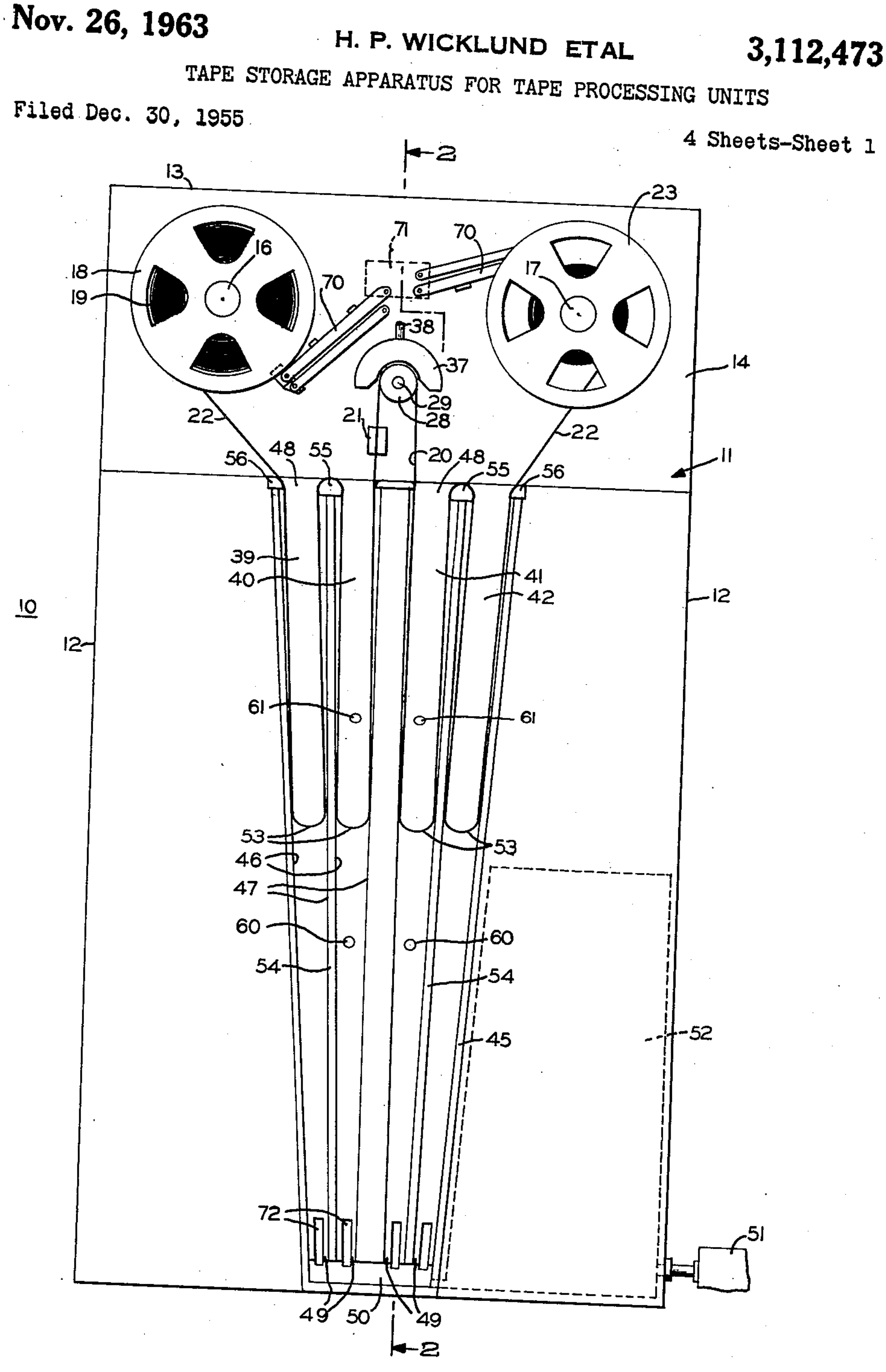
FIG. 1 is a front elevational view of a tape processing unit with the improved tape buffer storage section applied thereto.
Figures 2, 3, 4:
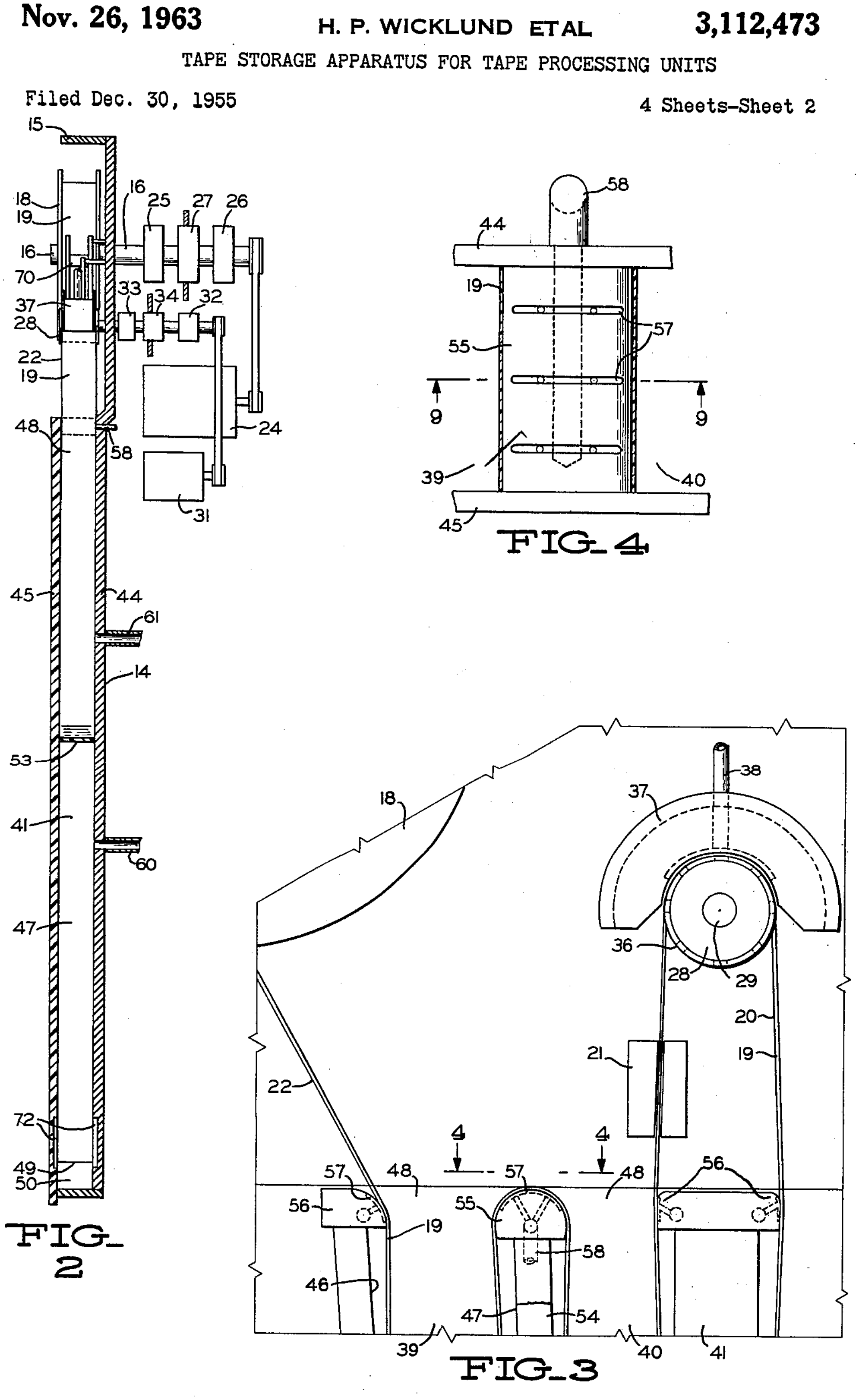
FIG. 2 is a side elevational view, partly in section, of the tape unit and taken on the line 2—2 of FIG. 1.
FIG. 3 is an enlarged partial vertical sectional view of the capstan and upper section of one of the pairs of vacuum chambers.
FIG. 4 is a horizontal sectional view of one of the tape bearings taken substantially on the line 4—4 of FIG. 3.

Referring now more particularly to the drawings for a detail description of the improved tape storing apparatus for a tape processing unit 10, there is shown in FIGS. 1 and 2 a cabinet 11 which includes side walls 12 along with top and front walls 13 and 14, respectively. The front wall 14 may be provided with a forwardly projecting upper section 15, only a small section of which is shown, for enclosing portions of the tape unit. In this arrangement a pair of spaced reel drive means or shafts 16 and 17, respectively, project through the front wall 14 which also provides a support for various elements required in the tape unit.

As shown, a tape spool or reel 18, hereinafter designated as a file reel, is securely mounted on the left-hand drive shaft 16 to rotate therewith. This reel will normally be loaded with a length of tape 19 wound in layers which is to be unreeled and fed through or by tape reading and recording means or heads 21. A length of unreeled or loose tape 22 is provided on both sides of the heads 21 for reasons to be hereinafter described.

With the tape moving in a forward direction, that is, from the file reel 18, it will eventually be coiled or wound on a second spool or reel 23, hereinafter designated as a machine reel. This machine reel 23 is secured to the drive shaft or spindle 17 and rotates therewith. Any suitable means for rotating the shafts 16 and 17, and thus the reels 18 and 23, in either direction or for braking the same may be provided.

By way of example only, the particular reel drive means may be of the type disclosed in James A. Weidenhammer et al. application, Serial No. 535,052, filed September 19, 1955 (now U.S. Patent 3,057,568) or Walter S. Buslik et al. application, Serial No. 468,832, filed November 15, 1954 (now U.S. Patent 2,919,076) both of which are assigned to the assignee of the present application. Since the particular reel drive means forms no part of the invention, it will be sufficient to say that each drive shaft 16 and 17 is connected to an independent constant speed motor 24 under the control of a pair of rotation reversing clutch means or mechanisms 25 and 26, respectively, and to a brake mechanism 27. The function of these elements will be hereinafter more fully described.

The reading and writing heads 21 may likewise be of any suitable type capable of reading magnetic data recorded as bits on the tape at high speeds and transmitting this data through amplifying and transmission means for use by a suitable electronic computer, data processing device or the like, not shown. Also the heads 21 may be capable of erasing and recording data on the magnetic tape at high rates of speed, which may be delivered thereto from the above-mentioned apparatus.

Directly above the reading and writing heads 21 there is provided a reversible tape drive pulley or capstan 28 which is the motive means for passing or translating the unreeled tape 19 by the reading and writing heads 21 in either direction. It is required that the capstan 28 and associated mechanism start from rest and rapidly accelerate the adjacent section of tape to its rated velocity past the reading and writing heads 21 for reading or writing at the proper bit density.

In order to provide this tape movement, the capstan 28 is secured to a shaft means 29 which in turn is connected to a constantly rotating drive means or motor 31 through shaft reversing clutch mechanisms 32 and 33, respectively, and brake means 34. In practice, a read, write or stop signal is transmitted from an external source, such as the computer, to read or write data on the tape. This control signal is transmitted to suitable control mechanism, not shown, which releases the brake 34 and selects the direction of the capstan rotation. The next signal is operative to either release the clockwise clutch 32 and apply the brake 34 or reverse the drive capstan 28 by engaging the counterclockwise clutch 33. When these control signals are received, the capstan must respond very rapidly.

In order to provide sufficient frictional contact between the uncoated or undersurface 20 of the tape 19 and capstan 28, a tape contacting outer cylindrical or drum surface 36 is provided with gripping openings or perforations. In addition, the upper portion of the capstan is closely spaced to a channeled header or cap member 37 to which fluid under pressure, such as air, is supplied from a conduit 38 connected to a suitable pressure source, not shown. Under operating conditions, the fluid under pressure passes through the channeled header, is diffused and directed against the top surface of the tape. Thus a relatively large area of the tape is subjected to this pressure which in turn causes the tape to be deflected or deformed slightly into the openings in the drum capstan surface 36. As this deformation of the tape occurs, the grip or frictional contact between the tape and capstan is increased to prevent relative movement therebetween during acceleration and deceleration.

Mounted on the outer facing portion of the front wall 14 of the cabinet and below the capstan 28 are a plurality of juxtaposed elongated open ended tape storage chambers or vacuum columns 39, 40, 41 and 42, respectively. The columns 40 and 39 disposed at the left of the drive capstan 28 define an inner or first column and an outer or second column, respectively, which is associated with the file reel 18. Likewise, the columns 41 and 42 define an inner or first column and an outer or second column, respectively, associated with the machine reel 23. As shown, each column includes a vertically extending parallel rear and transparent front wall 44 and 45, respectively, having smooth interior surfaces spaced slightly greater than the width of the tape 19, and oppositely facing side wall surfaces 46 and 47, whose spacing is varied from top to bottom to provide downwardly and inwardly tapering columns.

With the above construction, each column has a cross-sectional area which uniformly decreases from a maximum at the upper open end 48 to a minimum at its lower open end 49. As shown, the upper open ends 48 of the columns are exposed to the ambient atmosphere while the lower open ends 49 of the columns are connected with a central distributor or chamber 50 which in turn are connected to a vacuum producing means or pump 51 of any suitable type. The vacuum system preferably includes an accumulator 52 to absorb pressure fluctuations and maintain a substantially uniform subatmospheric or reduced pressure in the columns regardless of tape loop velocity.

In this embodiment the file reel 18 is rotated through the clutch 25 in a counterclockwise direction to remove or unreel the tape and the machine reel 23 is clutched to rotate in the same direction to wind or reel the tape which has been passed through or over the read and write heads 21 and the vacuum columns. To rewind the tape on the file reel 18, rotation of both reels is reversed by their respective clutches 26, that is, they are rotated clockwise.

To load or thread the tape 19 in the machine, an initial length of tape is placed between the drive capstan 28 and the air head 37 and secured to the machine reel 23. At the same time the flat surface of the unreeled sections 22 of the tape is placed over the upper open end 48 of each column. This partially seals the columns from the ambient atmosphere and the subatmospheric pressure or slight vacuum created in the columns draws the loose tape 19 into each column in a serpentive manner and forms a spaced, upwardly opening U-shaped tape loop 53 therein as shown in FIG. 1.

With atmospheric pressure acting on the inner magnetized surface of each loop 53 and subatmospheric pressure on the outer surface 20, it will be obvious that a pressure differential is created across the loops and all the slack or unreeled tape will be taken up. Thus the upwardly extending legs or strips of tape leading to the reels 18 and 23, capstan 28 and those lying adjacent the inner and outer column partitions 54 are placed under tension. A sufficient length of tape is unreeled into the vacuum columns 39 to 41 to provide an adequate supply of tape in the tape buffer storage for the drive capstan 28. Under normal static conditions, the tape loops 53 would be located substantially as indicated in FIG. 1.

Figure 5:
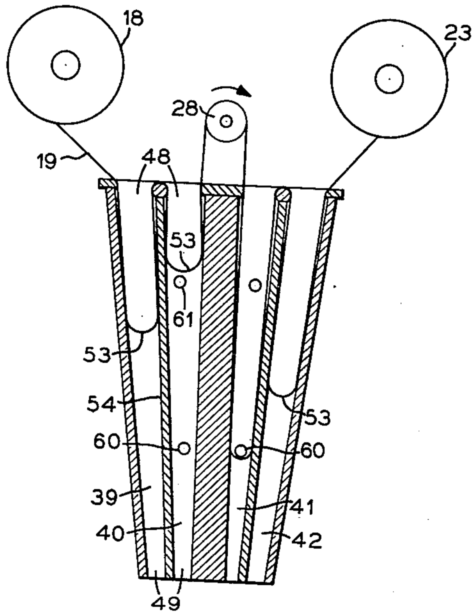
FIG. 5 is a diagrammatic view of the position of the tape shortly after the capstan is driven in one direction.
Figure 7:
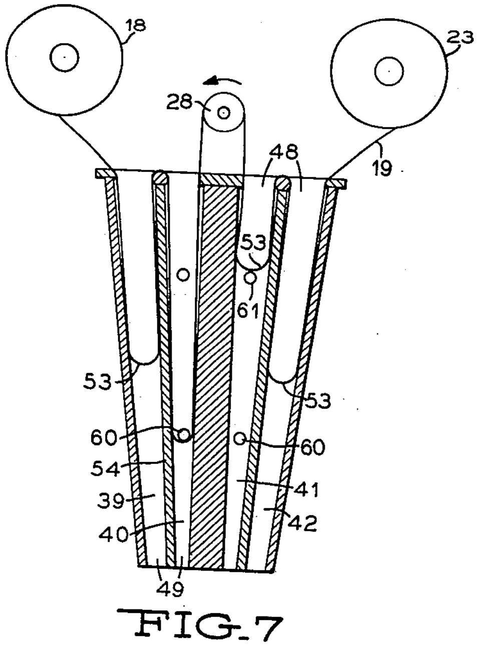
FIGS. 7 and 8 are similar to FIGS. 5 and 6 but showing the tape position when the capstan has been reversed.

From the foregoing it can be seen that if each loop of tape is substantially the same length, the loops 53 in each column 39 to 41 are disposed the same distance from the top. Therefore, each loop has the same exposed area which provides equal tension to each leg or strip of the upwardly projecting tape sections. Under these conditions the loops are balanced, that is, no internal unbalancing forces are developed to tend to displace the tape. However, should the length, hence the area subjected to the subatmospheric pressure, of one of the loops 53 between the columns 39 and 40 or 41 and 42 be greater than the other, as shown in FIGS. 5 and 7, a force differential between the adjacent tape loops is generated. This force differential is developed because the longer loop has its net area exposed to the vacuum reduced by the associated tapering side walls 46 and 47. Therefore, the net force in the longer loop is less than that in the shorter loop and when this difference exceeds some definite value, the unbalanced tensions between the loops will automatically transfer a portion of the tape forming the longer loop to the shorter loop. This tape transfer will continue until the adjacent loops are substantially equal in length and the forces and tape tensions are substantially balanced.

In order to make this automatic tape transfer as sensitive as possible, the upper end of each partition 54 is provided with a fluid pressure anti-friction bearing 55. In addition, fluid pressure bearings 56 are disposed at the upper open ends 48 of the columns opposite the bearings 55. As shown in FIG. 4, these bearings comprise a relatively smooth surface having fluid conducting channels 57 connected by suitable conduit means or the like 58 to the source of fluid under pressure. During tape operation, the high pressure fluid flowing through the channels 56 in the bearing surfaces acts against the back surface 20 of the adjacent section of the tape 19 and holds the same out of contact with the bearing surfaces 55 and 56. The bearings 56 force the tape laterally away from the associated walls and the fluid pressure delivered to the bearings 55 opposes the downward pull of the adjacent tape strips to hold the tape out of contact with the bearings 55. This in effect freely supports the tape and tends to hold the same out of contact with the metallic portions of the vacuum columns 39 to 42 to thereby reduce friction at these points and wear of the tape.

Figure 9:
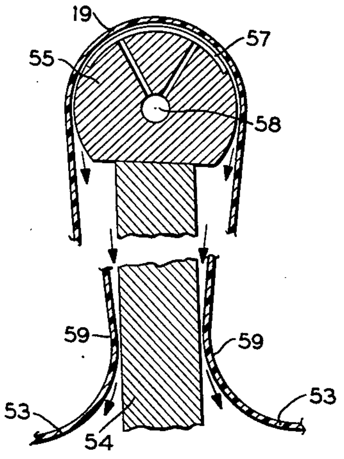
FIG. 9 is an enlarged diagrammatic view of the fluid pressure bearings and air flow around the tape for one of the tape storage columns taken on the line 9—9 of FIG. 4.
Figure 10:
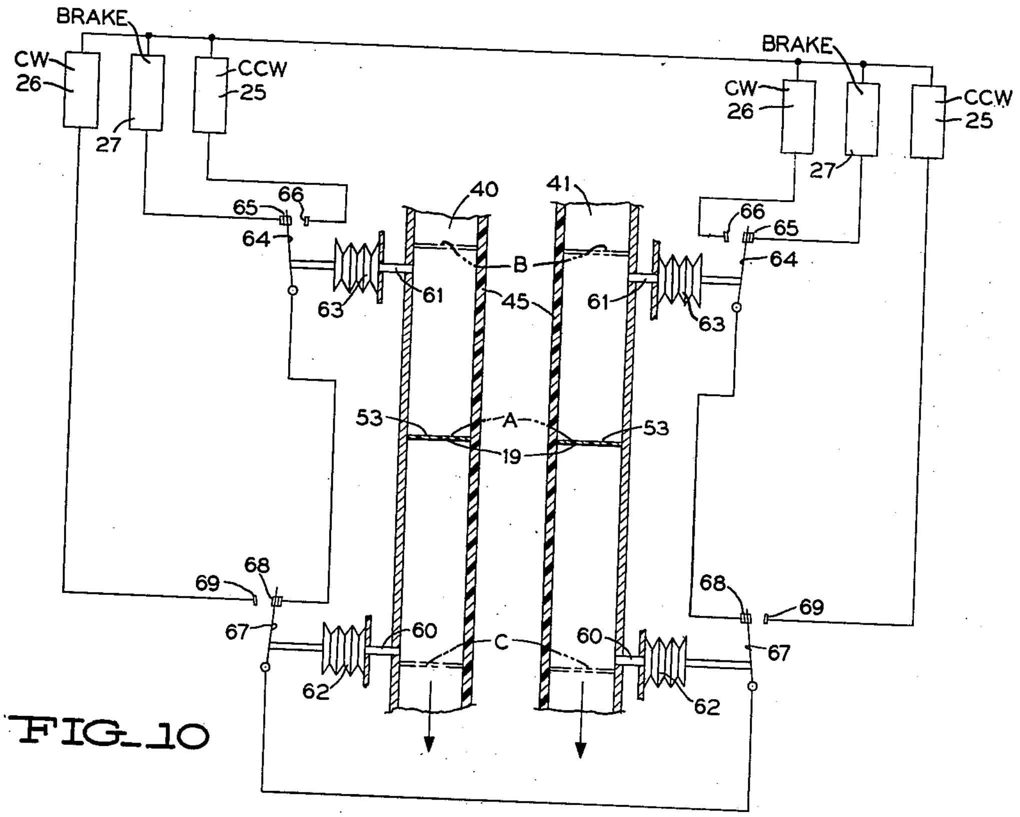
FIG. 10 is a simplified wiring diagram of one form of control for the reel drive motors and brakes.

Another important advantage of a construction of this type is that a portion of the fluid under pressure escaping from the bearing surfaces 55 and 56 flows downwardly between the tape and adjacent side walls of the columns and is drawn into the portion of the columns under the subatmospheric pressure. As shown in FIG. 9, the volume of air flowing along the side walls will be sufficient to overcome the atmospheric pressure acting internally and hold the outer extremities 59 of the loops 53 out of contact with the side walls. Thus with a construction of this type, it can be seen that the tape confined within the vacuum chambers is, in effect, suspended therein on an air cushion or film out of contact with the metallic or solid portions of the columns. In view of this, equalization between the adjacent inner and outer tape loops 53 is readily accomplished because external frictional forces have been reduced to a minimum.

The rear wall 44 of each of the inner columns 40 and 41 is provided with a pair of longitudinally spaced openings or ports 60 and 61, respectively, which directly communicate with related pressure responsive means or bellows 62 and 63, respectively. Referring to the left-hand inner column 40, the associated upper bellows 63 is connected to a double-throw switch 64 which includes contacts 65 and 66 for selectively completing a circuit to operate the brake means 27 or to energize the counterclockwise rotation clutch means 25, respectively. The lower bellows 62 is connected to a double-throw switch 67, which includes contacts 68 and 69 for selectively controlling the circuit to the upper switch 64 and the energization of the clockwise rotation clutch means 26, respectively.

A brief review of this circuit will show that if the tape 19 is in some position A between the upper and lower ports 60 and 61 in the column 40, the reduced pressure acting on the lower bellows 62 closes contact 68 in the switch 67 and atmospheric pressure acting on the upper bellows 63 transfers the switch 64 to close the contact 65 to energize the brake means 27 to thereby hold the file reel 18 stationary. If the bottom of the loop 53 is raised above the upper control port 61 to some position B, the reduced pressure is applied to both bellows 62 and 63 and the upper switch 64 transfers to close the contact 66 and energize the counterclockwise clutch means 25 to rotate the file reel 18 in the counterclockwise direction. This unreels the tape 19 which is directed to the outer column 39. Likewise, if the tape loop 53 is lowered below the lower control port 60 to some position C, both bellows 62 and 63 are subjected to atmospheric pressure and both switches 64 and 67 are transferred to the left. The transferred lower contact 69 energizes the clockwise clutch mechanism 26 to drive the reel in the clockwise direction to reel or wind the tape by removing the same from the outer column 39. While the upper bellows 63 closes the contact 65, energization of the brake cannot occur because of the open circuit condition of the lower contact 68.

Operation of the machine reel 23 is identical, except that the lower bellows 62 in the inner column 41 controls counterclockwise rotation of the reel 23 and the upper bellows 63 controls the clockwise rotation of the same reel.

With an arrangement of this type, it can be seen that the reel 18 is directly controlled by the length of tape in the inner vacuum column 40 and the reel 23 is controlled by the tape in the inner column 41 and that each reel is either rotated counterclockwise, clockwise or is held stationary. These are the only three conditions for the tape reels. It is to be understood, however, that the reel drive mechanisms are only shown by way of example because other means may be provided to accomplish the same result.

Associated with each tape reel is a follower 70 for the wound tape. These followers are provided to detect the approach of the end of the wound tape to thereby prevent complete unwinding. These followers may also operate through suitable control mechanism 71, the details of which are not shown, to modify their respective reel speeds to provide a substantially constant velocity for the tape being unwound from the one reel and wound onto the other.

*Operation*

Assuming the tape unit is stopped and tape 19 is distributed in each of the columns 39, 40, 41 and 42 in the position shown in FIG. 1 intermediate the control ports 60 and 61, the control bellows 62 and 63 cooperate with their respective ports and switches 67 and 64 to hold both the file and machine reels 18 and 23, respectively, stationary. The drive capstan 28 is also held stationary by its brake means 34. Under this condition, the tension on the loose tape sections is substantially uniform and is in a balanced condition, that is, all of the forces are equalized.

During this interval, the fluid under pressure directed through the capstan header 37 holds the tape 19 tightly against the perforated capstan drum surface 36 and the escaping fluid under pressure at the bearings 55 and 56 is likewise holding the tape out of contact with the walls 46 and 47 of their respective vacuum columns 39 to 42.

When the signal is delivered from an external source to read a record or series of records, the first action which occurs is that the capstan brake mechanism 34 is released and the constant speed capstan drive motor 31 is connected to its clockwise rotation clutch mechanism 32. The capstan 28 is immediately accelerated in a clockwise direction at a high rate of speed and translates the tape therewith to its rated velocity. This acceleration from rest to rated velocity is very rapid but must occur smoothly as possible to avoid undue stress on the tape.

As the tape moves from the position shown in FIG. 1, the tape in the inner column 40 is removed at a relatively high rate and in so doing shortens the over-all length of its tape loop 53. Since a normal time lag of response between the associated inner and outer vacuum columns 40 and 39, respectively, exists, the rapidly shortening inner loop 53 whose exposed area is increasing, will develop increasing tension on the tape strips in the column 40 which now exceeds that applied to the tape strips in the outer column 39. When this difference in tape tension exceeds some finite value, the tape in the outer column 39 automatically begins to transfer over the central air bearing 55 into the inner column 40, thereby tending to maintain the length of related tape loops 53 substantially equal.

During a relatively long reading operation, when a sufficient quantity of tape has been removed from the inner column 40, the lower end of its loop 53 moves above the upper control port 61, as shown in FIG. 5. As previously mentioned, this action applies a low pressure to the upper bellows 63 to close the contact 66 and energize the counterclockwise clutch means 25 which connects the file reel drive motor 24 to rotate file reel 18 in the tape unreeling or counterclockwise direction. Since the inertia of the reels, stored tape and drive mechanisms is relatively high when compared to the capstan drive and associated mechanisms, the rate of acceleration of the reel is considerably below the requirements of the drive capstan 28. It is during this interval that the tape in the columns must supply a major portion of the capstan demands.

Eventually, however, before the tape in the vacuum columns 39 and 40 is consumed, the velocity of the tape leaving the file reel 18 reaches and then exceeds that of the capstan 28 because the maximum tape translating velocity of the reels is greater than that of the capstan 28. When this occurs, tape will be fed into the outer column 39 at a faster rate than tape is being withdrawn from the inner column 40. Thus the length of the loop 53 in the outer column 39 increases to a greater degree over the inner column 40. As the differential tension between adjacent tape loops reaches a predetermined value, additional quantities of tape are now transferred automatically from the outer column 39 to the inner column 40 to increase the length of its tape loop 53.

Should either the capstan drive 28 receive a stop signal or the file reel 18 deliver tape at an excessive rate, the loop 53 in the inner column 40 increases in length, cuts off the upper port 61 from the influence of the vacuum and applies atmospheric pressure to the upper bellows 63. As soon as this occurs, the upper switch 64 transfers to disconnect the counterclockwise clutch means 25 from the constantly driven motor 24 and apply the brake means 27 to stop the file reel 18. As the file reel 18 decelerates to stop, the tape in the inner and outer vacuum columns 39 and 40 will continue to transfer until the loops 53 assume substantially equal lengths with substantially equal tensions applied thereto.

All during this interval, the fluid under pressure discharged from the bearings 55 and 56 maintains the tape out of contact with the metallic bearing surfaces and the downwardly flowing fluid holds the vertical sections of the tape loops out of contact with the downwardly and inwardly tapering side walls 46 and 47.

Figure 6:
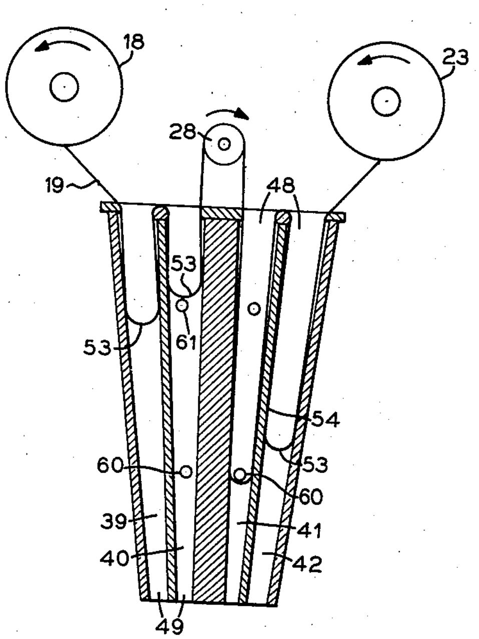
FIG. 6 is a similar view of the tape after the automatic tape transfer takes place and the related reels are operating to supply and remove tape from related columns.

Of course, while the above tape transfer operation was taking place in the left-hand columns 39 and 40, the tape moving into the other pair of vacuum columns 41 and 42 acts and was acted upon in a somewhat similar manner. However, in this instance with clockwise rotation of the capstan 28, the tape leaving the capstan is discharged into the right-hand inner column 41 and lengthens its loop 53. This rapid supply of tape to the inner column 41 reduces its effective loop area and creates a force differential between the related inner and outer loops 41 and 42, respectively, which acts to automatically transfer the tape therebetween to tend to maintain the tape loop lengths substantially equal, as shown in FIG. 6.

As the loop of tape in the inner column 41 is extended, it will drop below its lower control port 60 and connect the same to atmospheric pressure. The atmospheric pressure acting on the lower bellows 62 transfers its switch 67 and closes the contact 69 to release its brake means 27 and immediately connects the counterclockwise clutch means 25 with its related constantly rotating reel motor 24 to drive the machine reel 23 in a counterclockwise direction. Rotation of the machine reel 23 in the counterclockwise direction acts to remove the tape from its related outer vacuum column 42. Under normal conditions, the length of the loop 53 in the outer column 42 will be slightly shorter than the loop in the inner column 41 to maintain the automatic tape transfer from the inner to the outer columns by the difference in tension developed by the difference in effective loop areas.

As the machine reel speed exceeds the capstan 28, tape is withdrawn from the inner and outer columns faster than the feed. This shortens the loop lengths and as the inner loop moves upward and passes the lower port 60, the machine reel 23 is braked to a stop in the previously-described manner.

The reading or recording of data is usually a stepping operation, that is, the capstan may start, stop and reverse intermittently during its data processing operation. If these intervals are relatively short, for example, when reading or writing a single word or small group of words, the reels 18 and 23 may not always be actuated. It is only when the lengths of the inner loops 53 extend beyond the control ports 60 and 61 that the reels are operated.

A rewind operation is accomplished in exactly the same manner as a reading or writing operation, except that the direction of the capstan drive 28 is reversed along with the rotation of the file and machine reels 18 and 23, respectively. Another difference is that the rewind operation is usually a continuous operation. Under rewind conditions, the upper bellows 63, associated with the right-hand inner vacuum column 41, will initiate rotation of the machine reel clockwise in the tape unwinding operation and the related bottom bellows 62 associated with the left-hand inner vacuum column 40 initiates the clockwise rotation of the file reel 18 to reload the same. It will be recognized that data processing in either direction may be accomplished at the option of associated equipment arrangements without any limitations being imposed by this system.

FIG. 5 diagrammatically discloses, in an exaggerated manner, the position of the tape 19 in the various vacuum columns shortly after the drive capstan 28 is signalled to perform a read or write operation. FIG. 6 diagrammatically indicates the tape position after the reels have attained their proper speeds and are feeding and removing tape at substantially the same velocity as the output of the capstan. In these two representations, it is seen that after the initial acceleration of the capstan 28 has been overtaken by the reels, the tape loops in related columns are substantially the same length. However, the pair of loops on the feed side are shorter than that on the receiving side.

The increased loop lengths on the tape receiving side provides a buffer tape storage area greater than normal and is useful should the capstan receive a reverse signal while rotating at its rated forward speed. Under these conditions, the capstan 28 is capable of being stopped and reversed in a very short period of time, while the reels cannot be reversed at such a rate without damage to the tape and to the drive mechanisms. Therefore, the increased quantity of tape stored in the right-hand or tape receiving vacuum columns 41 and 42 permits this rapid capstan reversal to be accomplished without delay and without danger of damaging the tape. In addition, the difference in tape lengths between opposite pairs of columns provides an unbalancing force in the direction of the shorter looped section which aids in the capstan reversal. By the time the reels are stopped, reversed and reach their proper speeds, the tape loop lengths are reversed to the opposite sections.

Figure 8:
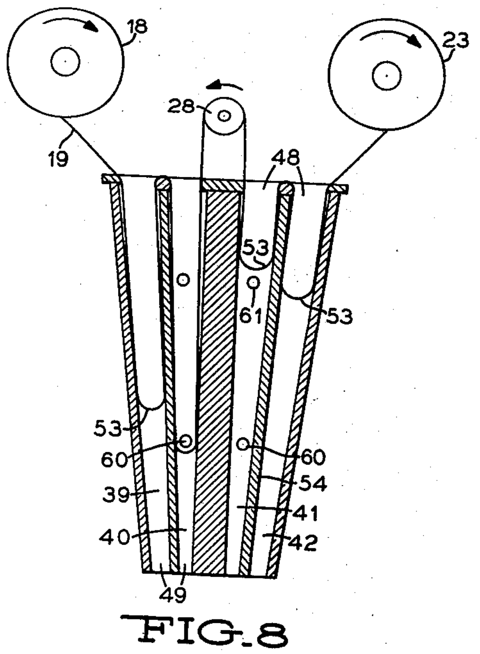

FIGS. 7 and 8 are identical to FIGS. 5 and 6, with the exception that the direction of tape movement has been reversed, for example, after a rewind or backspace signal has been received from the external source.

The front and rear walls 44 and 45 of each of the channels 39 to 41 are each provided with an inwardly opening vacuum destroying passage or groove 72, which extends from the distributor 50, a short distance into each column. These passages provide protection means for the tape stored in the channels. For example, should one of the various control means fail to function and the loop length is extended into one or more of the columns, as any loop passes the associated lower grooves 72, the distributor 50 leading to the vacuum pump 51 is directly connected to atmosphere through these grooves. Connecting the distributor 50 to atmosphere relieves the suction, and thus the tape tension, to thereby reduce the danger of having the looped section drawn into the distributor 50 wherein the tape may be torn or creased beyond repair.

From the foregoing it can be seen that there has been provided a multi-column increased capacity tape storage means in which data tape may be automatically transferred between related pairs of columns without an external driving means, also that a substantially frictionless structure has been provided for the tape as it threads through the columns out of contact with the columns. In addition, a means has been provided which permits high speed tape velocities, without danger of overloading the reel drive mechanism or damaging the tape.

While only two pairs of tape storage columns have been shown associated with a pair of tape reels, it is to be understood the number of vacuum columns could be increased above two and that the automatic transfer of tape from one column to the next would be applicable thereto.

While there has been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A buffer storage device for portions of loose lengths of tape, comprising a plurality of adjacent elongated tape receiving chambers each having an open end, the loose tape being looped into and out of the open ends of said chambers to provide looped tape sections, means for applying tension to the looped tape sections, means for translating the tape through said chambers, and means for varying the tension on the looped tape sections during translation of the tape to cause an automatic transfer of tape between chambers.

2. A buffer storage device for portions of loose lengths of tape comprising a plurality of adjacent elongated chambers each having an open end, the loose tape passing consecutively into and out of the open ends of said elongated chambers to provide a plurality of isolated looped tape sections, each looped tape section being variable in length within its elongated chamber, means for translating the tape through said chambers, means acting on adjacent looped tape sections having unequal lengths to automatically transfer tape between said chambers to maintain the looped tape sections substantially equal in length, the lengths of said equalized looped tape sections being variable within said elongated chambers, and means for relieving the tension on the looped tape sections when the same exceeds a predetermined length.

3. A buffer storage device for portions of loose lengths of tape comprising a plurality of associated elongated chambers each having an open end, the loose tape passing consecutively into and out of the open end of each elongated chamber to provide a plurality of isolated looped tape sections, each looped tape section being variable in length within each chamber, means for translating tape through said chambers by feeding or removing tape to or from one of said chambers, and means for applying tension to adjacent looped tape sections dependent upon differences in length therebetween for transferring tape between chambers independently of said translating means until the adjacent looped tape sections are substantially equal in length.

4. A buffer storage device for portions of loose lengths of tape comprising a plurality of associated enlongated chambers each having an open end, the loose tape passing consecutively into and out of the open end of each elongated chamber to provide a plurality of isolated looped tape sections, each looped tape section being independently variable in length within its chamber, means for feeding or removing tape to or from one of said chambers to shorten or lengthen the tape loop therein, tape tension means dependent upon differences in length between adjacent looped tape sections for automatically transferring additional quantities of tape between the adjacent chambers, and means dependent upon predetermined maximum and minimum lengths of the looped tape section in said one of said chambers for feeding or removing tape to or from another of said chambers, said tape transfer between chambers occurring automatically by the differential tension resulting from the difference in the tape lengths in each chamber.

5. A buffer storage device for portions of loose tape in a tape processing unit comprising a plurality of adjacent elongated chambers each having an open end, the loose tape passing consecutively into and out of the open end of each chamber to provide a plurality of separated looped tape sections therein, means for maintaining a fluid pressure drop across each of said looped tape sections to hold the same under tension, means for translating tape through said chambers, and means for varying the tension acting upon said looped tape sections in accordance with their lengths to develop a differential tension between looped tape sections and automatically transfer tape between chambers to tend to equalize the lengths of the looped tape sections.

6. A buffer storage device for portions of loose tape in a tape processing unit comprising a plurality of adjacent elongated chambers each having an open end, the loose tape passing consecutively into and out of the open end of adjacent chambers to provide a plurality of separate spaced looped tape sections therein, means for feeding and removing tape from the open end of one of said chambers to vary the length of the looped tape section therein, means for maintaining a fluid pressure drop across each of said looped tape sections to hold the same under tension, and means for varying the areas of each of the looped tape sections in accordance with their lengths so that the fluid pressure acting upon the variable areas will develop a differential tension between adjacent looped tape sections having unequal lengths to automatically transfer tape between said adjacent chambers to tend to equalize the lengths of the adjacent looped tape sections independently of said tape feeding and removing means.

7. A buffer storage device for portions of loose tape in a tape processing unit comprising a casing having a plurality of adjacent elongated open ended channels, each decreasing in cross-sectional area from one end to the other, the loose tape being inserted into said channels from their enlarged ends to provide looped tape sections whose area is defined at any given length by the cross-section area of said channel, means for creating a fluid pressure drop across the looped tape sections to hold the same under tension, means for translating tape to or from at least one of said channels to vary the length of the looped tape section therein and its exposed area with respect to an adjacent looped tape section and develop differential tape tension between sections, and fluid pressure antifriction means disposed between adjacent channels to urge the tape out of contact with said casing to assist in an automatic tape transfer between said channels to tend to equalize the looped tape lengths.

8. A buffer storage device for portions of loose tape in a tape processing unit comprising a plurality of adjacent elongated chambers, each chambers including a pair of parallel walls and a pair of oppositely facing inclined walls to provide a passage varying in cross-sectional area along its length with open ends having an enlarged and a reduced section, said loose tape passing consecutively into and out of the enlarged open end of each chamber to provide a plurality of independent separate looped tape sections, means acting through the reduced section openings in said passages for maintaining a fluid pressure drop across each of said looped tape sections to hold the same under tension, means for feeding or removing tape to or from one of said passages to vary the length of the looped tape section therein, and means dependent upon the length of the looped tape section in said one of said passages for feeding or removing tape to or from another of said passages, the cross-sectional areas of said passages increasing or decreasing the exposed tape loop area as the loop is lengthened or shortened to vary the tension on the tape in the respective passages to develop a differential tension between the adjacent looped tape sections effective to automatically transfer tape from the longer to the shorter looped tape section to tend to equalize the tape loop lengths therebetween.

9. In a tape processing unit, the combination of means for translating a length of tape from one location to another; a tape storage device divided into a plurality of individual passages, each passage including a tape receiving end through which the tape is inserted and removed to provide a looped tape section therein, and a pair of inwardly tapering side walls to provide a passage whose cross-sectional area decreases from the tape receiving end to an opposite reduced area end; means for connecting the reduced area end of said passages to fluid pressure reducing means to create a region of low pressure therein acting on the looped portions of the tape to hold the same under tension, said tapering passages modifying the area of the tape loops exposed to the reduced pressure to develop differential tape tension between adjacent looped tape sections when their relative lengths of tape are varied; and antifriction means between said passages to permit a rapid transfer of tape therebetween when the differential tension acting on the adjacent loops of tape exceeds some value to tend to equalize the looped tape lengths.

10. In a machine for reeling and unreeling tape, the combination of a pair of tape reels, independent means for driving each of said reels in either of two directions, tape drive means for selectively translating the unreeled tape in either of two directions, a buffer tape storage device for unreeled tape including a plurality of elongated open ended substantially identical chambers disposed between each reel and said tape drive means for receiving a looped length of tape in each chamber, each chamber tapering intermediate the open ends to provide a tape guiding surface whose cross-sectional area varies along the length of the chamber to vary the area of the loop in accordance with its length, and means for generating a fluid pressure difference across said looped tapes to provide tension on the looped tape sections, said chambers being effective when any of said drive means feeds or removes tape to or from said chambers to create differential tensions on the tape in accordance with the loop lengths to cause a tape transfer between adjacent chambers and tend to equalize the adjacent looped tape sections.

11. In a machine for reeling and unreeling tape, the combination of a pair of reels, independent means for driving each of said reels in either of two directions, a buffer tape storage device for unreeled tape including a plurality of elongated substantially identical chambers associated with each reel, the unreeled tape passing consecutively into and out of the open end of each chamber to provide a plurality of separated looped tape sections capable of independent variations in length, drive means disposed between a selected two of said plurality of chambers for translating the unreeled tape in either of two directions into and out of the associated chambers to lengthen and shorten the looped tape lengths therein, and means for applying tension to adjacent looped tape sections dependent upon differences in length therebetween for transferring tape between said chambers independently of said drive means until the adjacent looped tape sections are substantially equal in length.

12. In a machine for reeling and unreeling tape, the combination of a pair of tape reels, independent means for driving each of said reels in either of two directions, tape drive means for selectively translating the unreeled tape in either of two directions, a buffer tape storage device for unreeled tape including a plurality of elongated open ended substantially identical chambers disposed between each reel and said tape drive means for receiving a looped length of tape in each chamber, each looped tape section being independently variable in length within its chamber, tape tension means dependent upon differences in length between adjacent looped tape sections for automatically transferring additional quantities of tape between the adjacent chambers, and means dependent upon predetermined maximum and minimum lengths of the looped tape section in certain of said chambers for operating said independent reel drive means for feeding or removing tape to or from certain of the other of said chambers, said tape transfer between chambers occurring automatically by the differential tension resulting from the difference in the tape lengths in each chamber.

13. In a machine for reeling and unreeling tape, the combination of a pair of tape reels, independent means for driving each of said reels in either of two directions, tape drive means for selectively translating the unreeled tape in either of two directions, a buffer tape storage device for unreeled tape including a pair of elongated open ended substantially identical columns disposed between each reel and said tape drive means for receiving a looped length of tape in each column, each column tapering intermediate the open ends to provide a passage having a tape guiding surface whose cross-sectional area varies along the length of the passage to vary the area of the tape loop in accordance with its length, means for generating a fluid pressure difference across said tape loops to provide tension on the looped tape sections, said passages being effective when any of said drive means feeds or removes tape to or from said columns to create differential tensions on the tape in accordance with the loop lengths to cause a tape transfer between adjacent passages to tend to equalize the lengths of adjacent looped tape sections independently of said drive means, means dependent upon the length of the looped tape sections in one of each of said pairs of passages for operating said independent reel drive means for feeding or removing tape to or from the other of said pairs of passages, and tape tension relieving means disposed adjacent the lower open ends of said columns to limit the maximum length of the looped tape section in a column.

14. In a machine for reeling and unreeling tape, the combination of a pair of tape containing reels, independent drive means for each reel for rotating the same in either direction to unreel or reel the tape, tape drive means between said reels for translating unreeled tape in either direction, a pair of substantially identical elongated open ended inner and outer vacuum columns disposed on each side of said tape drive, each vacuum column including an elongated tapered passage whose cross-sectional area substantially uniformly decreases from an upper open end to a lower open end, a portion of the unreeled tape being disposed through the upper open ends of each of said columns and looped therein, vacuum producing means communicating with the lower ends of said columns to provide a fluid pressure drop across the looped sections of the tape to hold the tape leading to said reels and tape drive means under tension, the cross-sectional area of said columns being effective to vary the exposed area of the tape loop in accordance with its length, fluid pressurized bearing means disposed between each pair of columns and over which the tape slides during a tape transfer operation, means for initiating a tape translating operation through said tape drive means to withdraw tape from one of said inner columns and feed the same into the other of said inner columns and thereby respectively decrease and increase the lengths of their tape loops to modify the effective tape loop areas exposed to the reduced pressure and the tension on the tape therein, the change in effective areas developing a differential tension between the looped tape in the adjacent columns and causing an automatic tape transfer therebetween to tend to equalize their lengths, and pressure responsive control means associated with said inner columns for controlling said tape reel drive means, said last-named means being operative to feed tape into said outer columns when the tape loops in said inner columns reach a predetermined minimum length and effective to remove tape from said outer columns when the tape loop in said inner columns reach a predetermined maximum length.

15. In a machine for reeling and unreeling tape, the combination of a pair of tape containing reels, independent drive means for each reel for rotating the same in either direction to reel and unreel tape, tape drive means for translating unreeled tape in either direction, a pair of vertically extending substantially identical elongated open ended inner and outer vacuum columns disposed on each side of said tape drive, each vacuum column including an elongated tapered passage having a pair of parallel walls and a pair of oppositely facing inclined walls whose cross-sectional area substantially uniformly decreases from an upper open end to a lower open end, a portion of the unreeled tape being disposed through the upper open ends of each of said columns and looped therein to provide a pair of consecutive adjacent tape loops, vacuum producing means communicating with the lower ends of said columns to provide a fluid pressure drop across the tape loops to hold the tape leading to said reels and tape drive means under tension, the cross-sectional area of the passages acting to vary the effective area of the tape loops exposed to the vacuum to thereby vary the tension of the tape in accordance with the length of the tape loops, fluid pressure antifriction bearing means disposed at the upper ends of said columns to maintain the tape out of contact with the vacuum columns, a portion of the escaping fluid under pressure passing between the inclined walls of the passage and tape toward the region of low pressure to hold the tape out of contact with said inclined walls, means for initiating a tape translating operation through said tape drive means in a selective direction to remove tape from one of said inner columns and feed tape into the other of said inner columns to respectively decrease and increase the loop tape lengths therein, said decreased and increased tape lengths developing a differential tape tension with respect to the tape in the associated outer vacuum column to cause an automatic transfer of tape therebetween to tend to equalize the tape lengths therebetween, spaced pressure responsive control means communicating with each of the inner columns for selectively controlling the operation of the associated tape reel drive means, said control means in each column being operative upon sensing a predetermined short tape length in said inner column for initiating a tape unreeling operation to feed tape into its related outer column and responsive upon sensing a predetermined long tape length for initiating a tape reeling operation for removing tape from its related outer column, said transfer of tape between said inner and outer columns being automatically accomplished by the differential tension developed between related tape loops, and fluid by-pass means disposed adjacent the lower ends of said vacuum columns to reduce the pressure drop across any tape loop exceeding a predetermined maximum length.

16. A buffer storage device for portions of loose lengths of tape comprising a pair of elongated chambers having associated end portions, the loose tape passing consecutively into and out of the associated end portions of each elongated chamber to provide associated looped tape sections, each looped tape section being variable in length within each chamber, means for translating tape through said chambers by feeding or removing tape to or from one of said chambers, and means for applying tension to the associated looped tape sections dependent upon differences in length therebetween for automatically transferring tape between chambers independently of said translating means to tend to equalize the lengths of the looped tape sections.

17. A buffer storage device for portions of loose tape in a tape processing unit comprising a plurality of adjacent elongated chambers, the loose tape passing consecutively into and out of each chamber to provide a plurality of separate looped tape sections therein, means for maintaining a fluid pressure drop across each of said looped tape sections to hold the same under tension, means for translating tape through said chambers, and means for varying the tension acting upon said looped tape sections in accordance with their lengths to develop a differential tension between looped tape sections and automatically transfer tape between chambers to tend to equalize the lengths of the looped tape sections.

18. A buffer storage device for portions of loose tape in a tape processing unit comprising a plurality of elongated chambers having associated end portions, the loose tape passing consecutively into and out of the associated end portions of said chambers to provide a plurality of looped tape sections therein, means for feeding and removing tape from one of said chambers to vary the length of the looped tape section therein, means for maintaining a fluid pressure drop across each of said looped tape sections to hold the same under tension, and means for varying the areas of each of the tape loops in accordance with the length of the tape sections so that the fluid pressure acting upon the variable areas will develop a differential tension between associated looped tape sections having unequal lengths to automatically transfer tape between said adjacent chambers to tend to equalize the lengths of the associated looped tape sections independently of said tape feeding and removing means.

19. In a machine for reeling and unreeling tape, the combination of a pair of reels, independent means for driving each of said reels in either of two directions, a buffer tape storage device for unreeled tape including a plurality of elongated substantially identical chambers associated with each reel, the unreeled tape passing consecutively into and out of each chamber to provide separate looped tape sections capable of independent variations in length, tape drive means disposed between a selected two of said plurality of chambers for translating the unreeled tape in either of two directions into and out of the selected two chambers to lengthen and shorten the looped tape lengths therein, and means acting on adjacent looped tape sections on opposite sides of said tape drive means when unequal looped tape lengths are developed for automatically transferring tape between said chambers to tend to maintain the looped tape sections substantially equal in length.

20. In a web feeding apparatus, a work station, a web carrying reel, drive means coupled to said reel, a tapered loop box between said work station and said supply reel, said loop box including a mouth and a neck and having a decreasing cross-dimension between said mouth and said neck, said box being at least partially evacuated at the neck thereof and having a loop of said web contiguous with said box and extending from said reel into the mouth of said box and thence out of said mouth to said work station whereby the cross-dimensional size of said loop depends upon the position of said loop within said box, the mouth of said box being open to ambient pressure whereby a differential is imposed on the opposed sides of said loop in a magnitude dependent upon the position and cross-dimensional size of said loop in said box, means drawing said web past said work station thereby to change the position of said loop in said box whereby the cross-dimensional size of said loop and the differential pressure forces on said loop are changed, and means responsive to changes in differential pressure on the opposed sides of said loop for actuating said drive means whereby said reel tends to restore said loop toward its original position in said box.

21. The apparatus of claim 20 wherein said web comprises an elongated tape of information storage material, said work station comprising means selectively reading and writing information on said storage medium.

22. The apparatus of claim 20 wherein said web comprises a magnetic tape, said work station comprising a magnetic transducer for selectively storing information on said tape.

23. The apparatus of claim 20 wherein said means drawing said web past said work station comprises a rotating capstan, and pneumatic means for selectively impressing a force between said web and said capstan thereby to cause engagement of said capstan with said web.

24. In a tape driving system, a pair of tapered loop boxes having relatively wide mouths and relatively narrow necks, a common chamber communicating with each of said boxes between said necks, pneumatic means coupled to said loop boxes for evacuating said boxes and said common chamber, a work station, a length of tape extending into and out of the mouth of one of said boxes and thence passing past said work station into and out of the mouth of the other of said boxes whereby said tape is retained as loops within said boxes at positions in said boxes dependent upon the tensile forces in said tape, and drive means coupled to said tape for translating said tape out of one of said boxes past said work station into the other of said boxes, whereby changes in pressure within said boxes behind said loops due to changes in position of said loops in said boxes are adjusted in said common chamber.

25. The system of claim 24 including a tape supply reel carrying one end of said tape into one of said boxes, a tape take-up reel carrying the other end of said tape out of the other one of said boxes, first and second drive means coupled to said supply reel and to said take-up reel respectively, and first and second control means selectively actuating said first and second drive means in response to changes in tape tension between each of said reels and its associated loop box, respectively.

26. The system of claim 25 wherein said tape comprises an information storage member, said work station comprising means selectively storing information in said member and selectively reproducing it therefrom.

27. A buffer storage device for portions of loose lengths of tape, comprising a plurality of tape receiving chambers, each of said chambers having an open end, the loose tape being looped into and out of the open ends of said chambers to provide looped tape sections, and means for applying to each of said looped tape sections a tension of a magnitude varying with the length of said looped tape section in the respective one of said tape receiving chambers; and means for translating the tape through said chambers.

28. A buffer storage device for portions of loose tape comprising a chamber having an open end, the loose tape passing into and out of the open end of said chamber to provide a looped tape section, means for applying a fluid pressure to said looped tape section to apply tension to the tape, and means for varying the effective area of said looped tape section exposed to fluid pressure in accordance with the length of said looped tape section to modify the tension on the tape; and means for feeding and removing tape to and from the open end of said chamber to increase and decrease the length of said looped tape section.

29. In a machine for reeling and unreeling tape, the combination of a pair of tape reels, independent means for driving each of said reels in either of two directions, drive means for selectively translating unreeled tape between said reels in either of two directions, and a buffer storage device for said unreeled tape, said buffer storage including a separate plurality of elongated open ended chambers disposed between each of said reels and said drive means for receiving looped lengths of tape, said chambers having means for producing tensions in said looped lengths of tape for translating said unreeled tape between said chambers.

30. A buffer storage device for portions of loose tape in a tape processing unit comprising a plurality of open ended channels, each decreasing in cross-sectional area from one end to the other, the loose tape being inserted into said channels from their enlarged ends to provide looped tape sections whose area is defined at any given length by the cross-section area of said channel, means for applying a fluid pressure on the looped tape sections to hold the same under tension, means for translating tape from one of said channels to the other to vary the length of the looped tape section therein and its exposed area, and fluid pressure antifriction means disposed between said channels to assist in tape transfer between said channels.

31. A buffer storage device for portions of loose tape comprising a plurality of chambers, each of said chambers having an open end, the loose tape passing consecutively into and out of the open ends of said chambers to provide a plurality of separate spaced looped tape sections, and means for applying a fluid pressure to each of said looped tape sections to apply tension to the tape, one of said elongated chambers having means for varying the effective area of the looped portion of the tape exposed to fluid pressure in accordance with the length of said looped tape section thereof to modify the tension on the tape; and means for feeding and removing tape to and from the open end of said one of said elongated chambers to increase and decrease the length of the looped tape section therein to develop a tension differential between said looped tape sections effective to transfer tape between said chambers.

32. In a tape transport system, a vacuum column for tensioning the tape comprising a hollow rectangular pipe closed at one end and open at the other end, the narrow cross-sectional dimension of the pipe being only slightly greater than the width of the tape, whereby a loop of tape may be received in the pipe through the open end to act as a piston, means for evacuating the pipe in the region of the closed end, whereby the tape loop is pushed into the pipe and pressed against the narrow walls of the hollow rectangular pipe by an ambient air pressure at the open end of the pipe, and means including metering passages opening into the pipe adjacent the open end for admitting air under pressure adjacent the open end of the pipe into the region between the tape loop and the narrow walls of the pipe, the narrow walls of the pipe being curved outwardly at the open end of the pipe, the tape being drawn across the curved portion of the narrow walls by the tensioning of the loop in the vacuum column for restricting the escape of air between the narrow walls and the tape at the open end of the pipe, whereby the air admitted under pressure produces a continuous flow of air between the tape and the respective narrow walls of the pipe, the flow being toward the closed evacuated end of the pipe so that the tape is held away from frictional engagement with the narrow walls of the pipe.

33. In a tape transport system, a vacuum column for tensioning the tape comprising a hollow rectangular pipe closed at one end and open at the other end, the narrow cross-sectional dimension of the pipe being only slightly greater than the width of the tape, whereby a loop of tape may be received in the pipe through the open end to act as a piston, means for evacuating the pipe in the region of the closed end, whereby the tape loop is pushed into the pipe and pressed against the narrow walls of the hollow rectangular pipe by an ambient air pressure at the open end of the pipe, and means for admitting air under pressure adjacent the open end of the pipe into the region between the tape loop and the narrow walls of the pipe, the narrow walls of the pipe being curved outwardly at the open end of the pipe, the tape being drawn across the curved portion of the narrow walls by the tensioning of the loop in the vacuum column for restricting the escape of air between the narrow walls and the tape at the open end of the pipe, whereby the air admitted under pressure produces a continuous flow of air between the tape and the respective narrow walls of the pipe, the flow being toward the closed evacuated end of the pipe so that the tape is held away from frictional engagement with the narrow walls of the pipe.

34. In a tape handling device, the combination of means for moving tape past a transducer, walls defining a chamber adjacent the transducer and into which the tape is looped, means for producing a pressure differential across the opposite surfaces of the tape while it is looped in such chamber, and means providing at least one opening along the tape path for admitting a gaseous fluid to act against one of said surfaces of the tape to form a fluid cushion between the tape and at least one of the walls defining such chamber.

References Cited in the file of this patent

UNITED STATES PATENTS

| | | |
|---|---|---|
| 1,653,451 | De Ybarrondo | Dec. 20, 1927 |
| 2,710,153 | Baumrucker et al. | June 7, 1955 |
| 2,730,309 | Baer | Jan. 10, 1956 |
| 2,778,634 | Gams et al. | Jan. 22, 1957 |
| 2,792,217 | Weidenhammer et al. | May 14, 1957 |